July 6, 1965 D. A. KEIPER 3,192,765
VIBRATION TONOMETER
Filed July 17, 1962 2 Sheets-Sheet 1
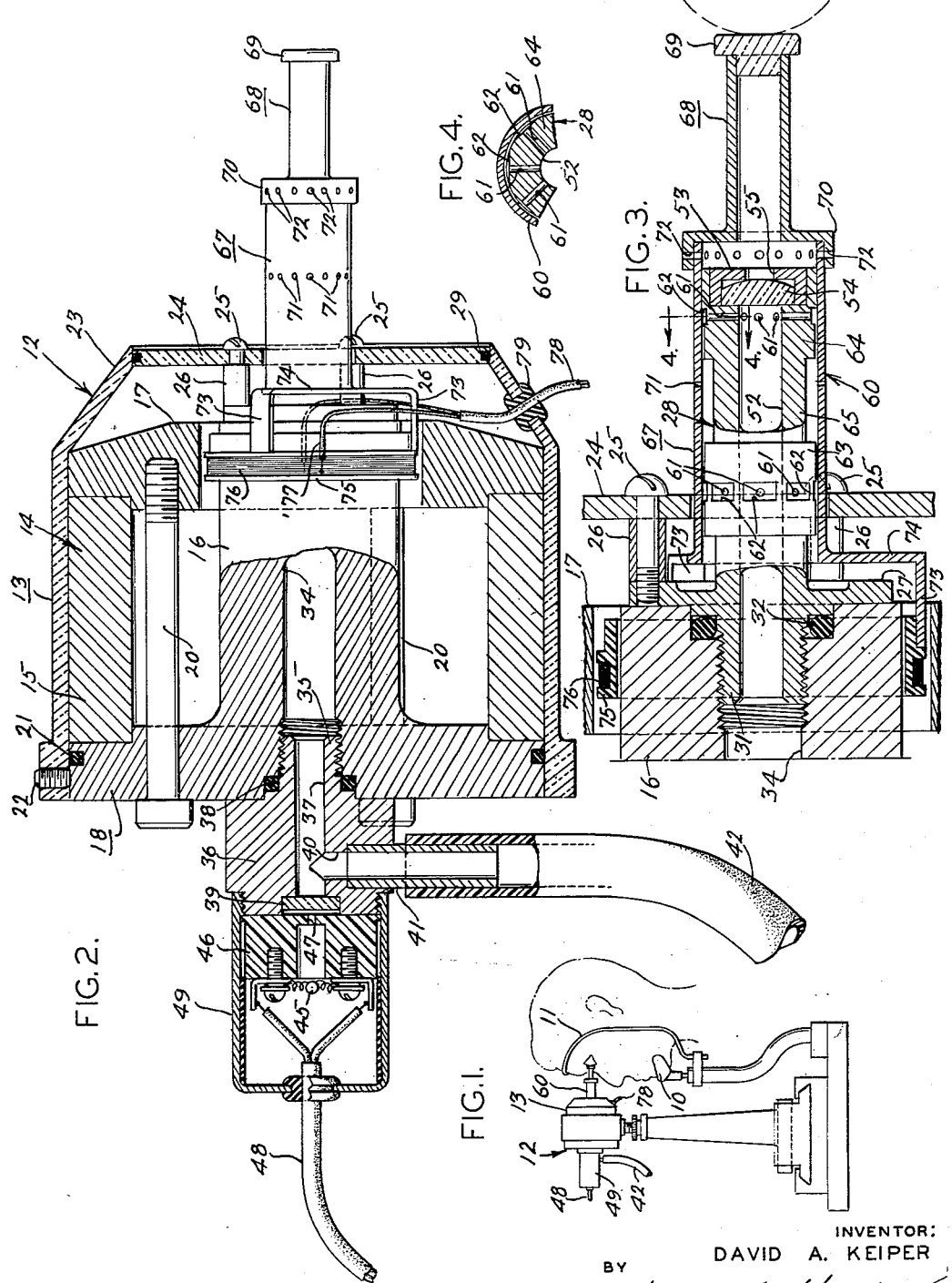
INVENTOR:
DAVID A. KEIPER
BY Howson & Howson
ATTYS.

July 6, 1965 D. A. KEIPER 3,192,765
VIBRATION TONOMETER
Filed July 17, 1962 2 Sheets-Sheet 2
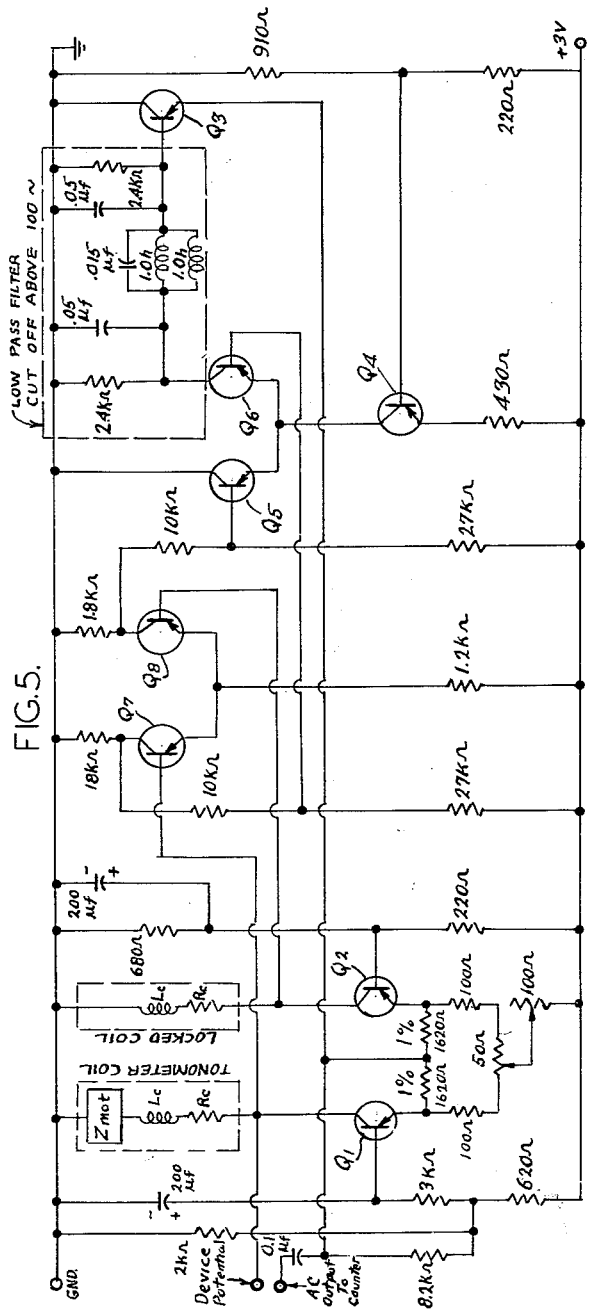
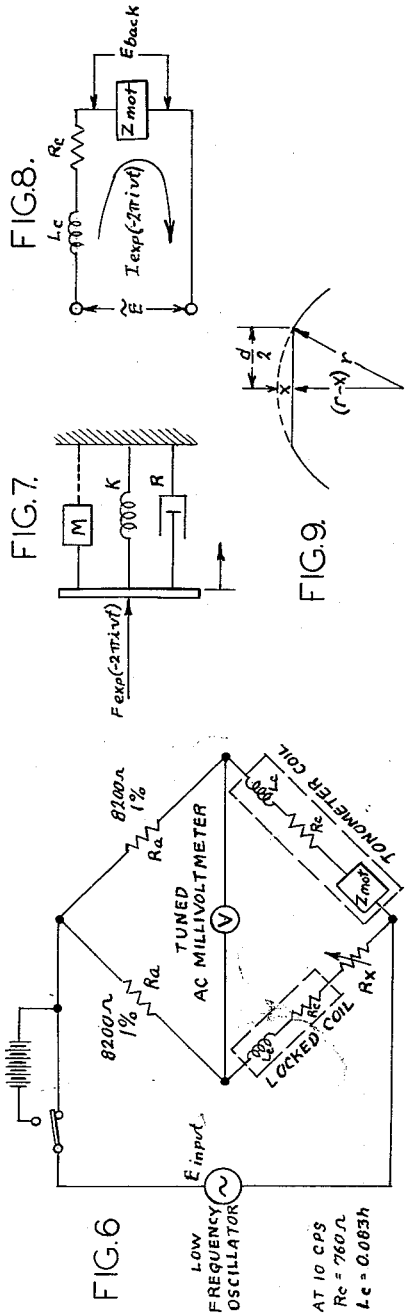
INVENTOR:
DAVID A. KEIPER
BY Howson & Howson
ATTYS.

United States Patent Office 3,192,765
Patented July 6, 1965

3,192,765
VIBRATION TONOMETER
David A. Keiper, Philadelphia, Pa., assignor to The Franklin Institute, Philadelphia, Pa., a corporation of Pennsylvania
Filed July 17, 1962, Ser. No. 210,405
10 Claims. (Cl. 73—80)

This invention relates to a vibration tonometer of the type disclosed in the application of Karl Sittel, Serial No. 843,265, filed September 29, 1959, Patent No. 3,070,087, and has for an object the improvement of the tonometer and its method of use.

The tonometer with which the present invention is particularly concerned is designed to measure the tone or tension of the eye, more specifically to measure the intraocular pressure (often referred to as I.O.P.) to determine the condition of the eye. Many abnormal conditions of the eye are accompanied by abnormal internal pressure, glaucoma being one of the principal abnormal conditions involving abnormal pressure and the one to which most attention of clinical and public health programs is directed.

It is highly desirable that there be provided an instrument and method which can readily be used by technicians of less skill and training than have been required in the use of most ocular tonometers. The tonometers commonly used, as is well known in the art, normally require the services of a physician. The present device can be used without extensive training, hence is well adapted for mass screening examinations by mobile health units, as is now increasingly desired.

Tonometers measure the internal pressure of the eyeball by some type of impression reaction. It is not necessary to discuss the various kinds of devices which are used because most of them are well known. They are discussed to some extent in the Sittel application referred to above. It is sufficient for present purposes to note that the Sittel tonometer operates on the imposed vibration principle, that is, one in which a small amplitude vibration of controlled frequency is imposed upon the eyeball and the response thereto registered as a measure of the internal pressure condition of the eyeball.

The Sittel instrument fully demonstrated the practicability of its novel principles and means of examination but in some details it has been found to be subject to improvement and it is the object of the present invention to provide various improvements thereon.

The Sittel device employed a power-vibrated plunger carrying a small plate for contact with the surface of the eyeball, with or without the interposition of the eyelid. However, with the design of parts there adopted, it proved to be difficult to reduce the weight of the vibrating unit sufficiently to bring it into the desired relationship to the weight of the eyeball. It is desirable that the weight of the plunger be somewhat less than the weight of the eyeball. This relative weight ratio appears to be very important for the procurement of reliable data and the present invention provides a design which satisfies this requirement.

The prior device provided a gas-float reciprocatory bearing but the arrangement did not obtain as free movement with as little gas as desired; the present design greatly improves this detail. The design of parts is such, however, that a gas-float bearing may not be necessary in all cases.

Some prior devices had openings near the eye where liquid from the eye might enter. The present device allows gas escape only at a distance from the eye and has no openings near the eye for the possible entry of liquid. This aids in keeping the parts sterile and free from corrosion.

The prior device used gas pressure to impose a small constant force upon the plunger urging the contact plate toward the eyeball. The present invention provides a more reliable steady pressure or basic initial bias by using a magnetic effect on a coil or, more specifically, the effect of current on a coil within a magnetic field.

It also provides a plunger of such light weight that with a slight negative bias opposing gravity the instrument can be used on a subject in a reclining position instead of an upright position.

The present invention provides further benefits by using a single coil, not only for the vibratory and signal functions, but to impose a basic or initial bias as well.

The prior device provided a coil of a length greater than that of the magnetic pole pieces with which it was associated; the present invention obtains an improved action by making the pole pieces longer than the coil. This also aids the coil in the performance of the additional duty hereby required of it.

The prior device sought a resonant frequency at which the reciprocatory amplitude was a maximum. The present invention provides improved means for achieving the desired frequency by employing lighter reciprocating parts and also by using improved coil and circuitry arrangements. The present invention provides two modes of operation, one in which resonance frequency is attained automatically and another in which a low frequency vibration with accompanying small amplitude of movement is used and the relative pressure effects are determined by measuring the reactive component of output of a specially designed bridge with a tuned millivoltmeter to eliminate the possible effects of vibrations or movements in other ranges of amplitude or frequency.

The prior device used a frame to fit the peripheral ocular area of the subject. This area varied so much with various subjects that it was difficult without complex adapters to obtain proper initial instrument location on the cornea in all cases. According to the present invention means are provided for obtaining adjustable location of both the subject's head and of the instrument so that it is easier to use the instrument and easier to obtain uniform results.

In addition, the present invention provides a fixation light with parallel rays to aid in locating the instrument and holding the subject's attention, the design of the basic details of the operating parts for other purposes being such as to make the use of such a light practicable. A light system using parallel rays avoids muscular reaction or accommodation by the subject which would change the intraocular pressure. It is believed to be novel to provide a light on the same eye that is being tested for intraocular pressure. If the test is made with the eyelid closed a brighter light will be used and it is not so necessary to have parallel light rays, neither is it necessary to use a local anesthetic when the instrument is placed on the eyelid.

The above and other features and objects of the invention as well as various advantages will be apparent from the following description of an exemplary embodiment, reference being made to the accompanying drawings thereof, wherein:

FIG. 1 is an elevational view showing a device embodying the present invention in use on the eye of a subject in erect or sitting position;

FIG. 2 is an enlarged axial section of a tonometer embodying the present invention;

FIG. 3 is an enlarged axial section of the front portion of the device;

FIG. 4 is a partial transverse section taken on the line 4—4 of FIG. 3;

FIG. 5 is a wiring diagram of a circuit which can be employed with this tonometer;

FIG. 6 is a diagram of another circuit which can be used with the tonometer;

FIG. 7 is a study diagram used in a discussion of the principles of operation of the device;

FIG. 8 is another study diagram; and

FIG. 9 is another study diagram.

In order to provide a concrete understanding of the invention as quickly as possible there will first be described an embodiment of the improved apparatus, after which the circuitry, method of use and some theoretical considerations will be discussed.

As shown in FIG. 1, when the tests are conducted with the patient in erect or sitting position, the chin may be held in a chin rest 10 and the forehead held in a frame 11. In order to provide relative stability, the common base which carries the head rest parts, preferably adjustable in position, will also carry an adjustable stand for the tonometer which is generally referred to by the numeral 12. Some suitable adjustable head and instrument mounting device such as a commercial Bausch and Lomb unit may be used.

As shown in FIG. 2 the instrument 12 comprises a casing 13, preferably of non-metallic or non-magnetic material, which encloses a permanent magnet 14, as of a strongly magnetic material such as "Alnico," including an annular magnetic member 15, an inner pole piece 16 and an outer pole piece 17. The pole piece 16 is formed as a central extension of a plate element 18 which engages one end of the magnet ring 15 and the pole piece 17 is formed as a ring of sufficient thickness to provide a cylindrical pole face which engages the other end of the magnet ring 15.

The plate element 18 and the annular member 17 are secured together in clamping relationship on the magnet ring 15 by a plurality of screws 20 which pass through the plate 18 and are threaded into the annular member 17. Care is taken in the selection of material, by insulation or otherwise, to avoid affecting the action of the magnet by these connecting bolts. The connected magnet unit constitutes the main strength component of the assembly.

A dust and gas seal in the form of an O-ring 21 is provided between one end of the casing 13 and the magnet plate 18 and the casing is secured to the plate 18 by a plurality of screws 22.

The other end of the casing 13, which may have a frusto-conical portion 23 preferably of transparent plastic material such as "Lucite" or "Plexiglas," is closed except at the center by an annular plate 24 which (FIG. 3) is secured, as by a plurality of screws 25 with sleeve spacers 26 thereon, to a flange 27 of a tubular plunger-supporting core member 28. A seal, as an O-ring 29, is provided around the plate 24.

The core member 28, which is of non-magnetic material such as stainless steel or aluminum, had a reduced stem portion 31 which is threaded into the end of the inner pole piece 16, a sealing O-ring 32 being secured therebetween.

The extension carrying the inner pole piece 16 has a central bore 34 therethrough for the passage of gas and light; and at the end opposite the core or plug 28 there is secured in the end of the bore 34, as by threading, the reduced stem 35 of a tubular fitting 36 having an axial bore 37 therethrough. An O-ring 38 seals the stem in the bore 34.

A transparent gas seal 39 is secured, as by adhesive, in the outer end of the bore 37. Gas, such as dry air or preferably dry nitrogen which is non-corrosive, is supplied to the bores 37, 34 by a side duct 40 in the fitting 36, a supply nipple 41 being secured in the duct 40; and a conduit, such as a flexible hose 42, connecting the nipple 41 to a suitable gas supply at the desired pressure.

Means are provided for supplying a parallel beam fixation light through the axis of the bores of the assembly, the means here shown comprising a small lamp 45, known as a "Pinlite," mounted on a tubular insulating bushing 46 which at the inner end is provided with a small halo aperture 47. The lamp is supplied with current by suitable conductor leads from an electrical cable 48 and the entire lamp unit may be enclosed by a removable cap 49 which is secured on the fitting 36, as by being threaded thereon or by being pushed tightly thereon.

The outer end of the duct 52 of the core or plug 28 is covered and sealed by a lens mounting 53 carrying a lens 54 and provided with an aperture 55. The lens 54 produces a light with parallel rays. The mounting may be adhesively or otherwise suitably secured on the end of the core 28.

A very light tubular reciprocatory plunger 60, as of accurately machined and finished aluminum, is slidably mounted on the exterior of the core 28 and has a substantially frictionless sliding bearing support thereon, one such arrangement being by a film of gas escaping from an annular series of small radial outlet openings 61 in flats 62 provided in each of two enlarged portions 63, 64 of the plug. The escape is not very rapid. An annular exterior groove 65 is left between the enlarged portions 63 and 64.

The enlarged portions 63 and 64 fit fairly closely within a tubular sleeve portion 67 of the plunger 60, enough space being left for a gas float bearing therebetween.

A tubular member 68, preferably of machined stainless steel, carries a transparent eye contact plate 69, preferably a transparent plastic such as "Plexiglas" or "Lucite" which is sealed as by adhesive, in its outer end and has an enlarged flanged skirt 70 secured to the outer end of the sleeve portion 67, as by a press fit.

Openings 71 in the sleeve 67 above the groove 65 of the core 28 and openings 72 in the end of the sleeve 67 and the telescoped skirt 70 provide for gas escape at a distance from the eye and in a direction to avoid reaching the eye. There are no openings left where liquid from the eye can enter the instrument.

At its inner end the tubular sleeve portion 67 is provided with an enlarged skirt spider portion 73 carried by a radial spider portion 74, three spaced spider arms being provided here. The sleeve portion 67 has a close non-binding fit within the central opening of the annular end plate 24 of the casing.

On the inner end of the skirt 73 there is secured a non-metallic coil bobbin 75 on which is wound a coil 76 of extremely small light insulated wire, for example 800 turns of #46 wire. Leads 77 connect the coil to suitable connections to be described presently, the leads passing to a cable 78 which is sealed in a hole in the casing by a bushing 79. The leads have long free spans so that no interference with the action of the plunger and no breakage effect on the leads is encountered.

The tubular plunger may be made of extremely thin material and the entire plunger assembly, including the eyepiece, bobbin and coil, will weigh no more than approximately two grams. This has such a relationship to the weight of an average adult human eyeball that the operation of the plunger does not unduly affect the main mass of the eyeball on which it is placed. It does not compress the eyeball enough to materially increase its internal fluid pressure or cause an outflow of fluid. If the plunger should rest by gravity on the eyeball its weight will be about right, with a negative bias approximately equal to the positive bias for erect testing, for the desired test action, yet not so great that its steady weight bias will cause any appreciable flow of fluid out of the portion of the eyeball under study.

It will be noted that the effective axial length of the magnet pole pieces 16 and 17 is considerable, that the axial length of the coil 76 is relatively short in comparison, and that the center of the length of the coil is located at about the mid-length of the pole pieces when the plunger occupies a central position. This arrangement provides considerable latitude in making initial settings since the action on or by the coil is approximately unchanged throughout the length of travel of the coil between the ends of the effective length of the pole pieces, specifically here the axial thickness of the annular outer pole piece 17. The length of vibratory movement of the plunger will be extremely small, a matter to be discussed later.

The flat portion of the transparent plate 69 which engages the cornea is about 7.5 mm. diameter and the total diameter, including the rounded edges, is about 8 mm. This has been found to be a suitable size for use on average adult human eyeballs.

With the coil arranged as described, it can be supplied with alternating current of desired frequencies below and above those required to match the resonant frequency of the eye-mass system being examined. Also a direct current component of suitable value can be applied to bias the coil and contact pad against the cornea initially. By suitable instrumentation connected to the coil leads the signal registered by the movement of the coil within the magnetic flux can be determined.

FIG. 5 shows an all-transistorized circuit for automatically seeking the mechanical resonant frequency. It supplies a component of direct current for biasing toward the eyeball and generates an alternating current for vibrating the coil and plunger. An electronic counter can be used with it to read frequencies directly, such electronic counters being well known.

In the circuit of FIG. 5 representative values are as indicated thereon. It may be explained that the transistors Q1 and Q2 provide a constant current source; transistor Q3 is an emitter follower to drive the bridge; transistor Q4 is a constant current device for the rejection of the common mode signal in the differential amplifier; transistors Q5 and Q6 provide second stage differential amplification; and transistors Q7 and Q8 provide first stage differential amplification. The signal is fed back positively through transistor Q3 to drive the bridge circuit which includes the tonometer coil and the locked coil together with the transistors Q1, Q2 and associated resistances. The D.C. bridge output is minimized by negative feedback through the base of transistor Q1.

The circuitry is essentially a bridge circuit whose output is fed back positively to drive the bridge itself. Thus it is an oscillator. The frequency of oscillation tends to go to the frequency at which the bridge is most unbalanced. Maximum unbalance occurs at the frequency of mechanical resonance.

The power input is a 3 volt D.C. supply. Oscillation begins due to a slight electrical or mechanical unbalanced condition. The bridge output is at the high side between the tonometer coil and the locked coil. The A.C. bridge output is amplified by Q7, Q8 and Q5, Q6 and is filtered by the filter pass circuit shown in the broken line enclosure to eliminate spurious H.F. oscillations.

FIG. 6 shows a bridge circuit which can be used for measuring vibration response at low frequencies. Here the resistance $R_x$ is adjusted to be approximately equal to the real part of the motional impedance. Then the tuned A.C. milli-voltmeter will measure the imaginary part. The ratio of the A.C. voltmeter output ($\delta E_{output}$) to the A.C. bridge input voltage ($E_{input}$) is simply related to the imaginary part of the motional impedance as:

$$\frac{\delta E_{output}}{E_{input}} = \frac{\delta Z_{mot}}{R_a + R_c}$$

Calibration of the bridge is fairly simple. The circuit provides driving and detecting at the same constant frequency. The effect of extraneous "noise" is greatly reduced or eliminated.

The eyepiece indents the surface of the eye slightly. In the use of the device a few droplets of water are deposited around the edge of the end of the eyepiece. The plastic material used is less wettable than glass and more wettable than glass having a non-wettable coating. This provides a meniscus with a large radius of curvature with small surface tension. The normal fluid film on the eye and hence at the center of the eyepiece is very thin, the oily film of the eye preventing the formation of droplets.

Principles of the vibration tonometer

The typical tonometer works on the principle that the forces resisting indentation of the cornea depend upon the intraocular pressure. There is measured the force necessary to give a certain indentation (Goldman applanation tonometer), or the indentation resulting from a certain force (Schiotz tonometry).

The vibration tonometer, on the other hand, uses the ratio of an incremental change in force with an incremental change of indentation (i.e., the spring constant) in obtaining the intraocular pressure. By vibrating a mass pressed into contact with the cornea there can be obtained the spring constant of the cornea. There are two ways to obtain spring constant by vibration. One is to find the natural frequency of resonance of the mass-spring combination, and the other is to vibrate at a constant frequency (well below the resonant frequency) and measure the vibration response at that frequency.

However, the spring constant of the cornea will depend on some factors other than the intraocular pressure, such as the way in which the mass makes contact with the cornea, the net force with which the mass pushes against the cornea, the properties of the cornea (radius, thickness and elasticity), and also on the fluid film around the region of contact. Then for a vibration tonometer to be practical, the dependence of spring constant on intraocular pressure must be sufficiently direct so that normal variations in eye structure between different people do not overwhelm the effect of varying intraocular pressure.

In a complex vibrating system, such as is found in the case of the human eye, there may be a number of modes of vibration. The moving element of the vibrating tonometer must contain somewhat less mass than the eyeball in order that only a single mode of vibration will be excited—preferably the mode in which the mass of the devise excites only a local vibration on the cornea.

One particular system which satisfies the above requirements (as described hereinabove) contains a moving element of a couple of grams of mass. The moving element contains a coil within a radial magnetic field, a bearing surface to support the element, and a flat plate to make contact with the cornea. Bearing friction can be reduced to the vanishing point by use of a gas lubricated bearing (i.e., the mass rides on a thin film of gas). The coil serves simultaneously for applying a net force of a couple of grams against the cornea (by applying a D.C. potential to the coil), for exciting a microscopically small vibration (by applying a very small A.C. potential to the coil), and for detecting the resonant frequency of vibration response (by observing the A.C. potential induced in the coil by the mechanical vibratory motion). Electronic circuitry can be used to detect the resonant frequency or measure the vibration response. The results can be read off directly from an electronic counter or on a meter and converted to intraocular pressure by means of a calibration curve.

Equations governing a vibrating system

The characteristics of vibrating systems generally lend themselves to theoretical analysis. Hence there will be derived equations for the vibration of a mass M in contact with a spring of spring constant K and of viscous damping coefficient R. There is considered a sinusoidally varying driving force (maximum value F and frequency $\nu$) applied to the mass, letting $x$ denote the position of the mass. This vibrating system may be represented as in FIG. 7 by a mass, spring, and dashpot. Here, the mass M is contributed almost completely by the device, and K and R are contributed almost completely by the springiness and viscous damping of the corneal region of the eyeball. There will be considered only a small local vibration upon the cornea in a direction prependicular to the surface of the cornea. With the mass of the device against the cornea several times smaller than the mass of the eyeball, the major portion of the eyeball may be considered to be an inertial frame of reference. Also, this allows the vibration to be considered as having a single mode.

By summing up the instantaneous forces acting, there is obtained the differential equation for the motion of the mass:

(1) $$M\frac{d^2x}{dt^2}+R\frac{dx}{dt}+Kx=F\exp(-\pi i \nu t)$$

(For background on the derivation of these equations, see Morse, P.M.: "Vibration and Sound", McGraw Hill, New York, 2nd edition [1948], chapters I and II).

The steady state solution of Equation 1 is:

(2) $$x=\frac{\left(\frac{K}{2\pi\nu}-2\pi\nu M\right)+iR}{R^2+\left(\frac{K}{2\pi\nu}-2\pi\nu M\right)^2}\frac{F\exp(-2\pi i\nu t)}{2\pi\nu}$$

When Equation 2 is differentiated, there is obtained the velocity of motion of the device:

(3) $$V=\frac{dx}{dt}=\frac{R-i\left(\frac{K}{2\pi\nu}-2\pi\nu M\right)}{R^2+\left(\frac{K}{2\pi\nu}-2\pi\nu M\right)^2}F\exp(-2\pi i\nu t)$$

If the driving force is applied to the mass by electromechanical means (i.e., by applying a current to a coil placed in a radial magnetic field), Equation 3 for the velocity of motion becomes very useful. When the same coil is moved through a permanent magnetic field, a voltage ($E_{back}$) is induced into the coil, and this voltage is proportional to the velocity of motion (V):

(4) $$E_{back}=\frac{D}{10^7}V$$

The driving force on the coil $F\exp(-2\pi i\nu t)$ is directly proportional to the current passing through the coil $I\exp(-2\pi i\nu t)$:

(5) $$F\exp(-2\pi i\nu t)=DI\exp(-2\pi i\nu t)$$

Here, D is the electromechanical constant, the same constant as found in Equation 4. (Note: The factor $10^7$ appears in Equation 4 because it is preferred to use CGS mechanical units, and MKS electrical units.) D depends upon the strength of the radial magnetic field, coil dimensions, and the number of turns on the coil.

It will be noticed that in Equation 3 the steady state mechanical motion (of the system having K, M, and R) is described in terms of velocity and force. However, because of the relations given in Equations 4 and 5, it is seen that the mechanical motion could be described instead by electrical terms such as back E.M.F. of the coil and current passing through the coil (as long as the constant D for the system is known). This is an advatage since it is possible to accurately display the mechanical parameters by an electrical reading on a meter. Now by substituting Equations 4 and 5 into Equation 3 there is obtained the electrical characteristics due to the mechanical motion:

(6) $$E_{back}=\frac{D^2}{10^7}\frac{R-i\left(\frac{K}{2\pi\nu}-2\pi\nu M\right)}{R^2+\left(\frac{K}{2\pi\nu}-2\pi\nu M\right)^2}I\exp(-2\pi i\nu t)$$

Now consider applying a sinusoidal current $I\exp(-2\pi i\nu t)$ to the coil. The coil circuit may be represented as in FIG. 8 where the coil has both resistance ($R_c$) and inductance ($L_c$) and a back E.M.F. ($E_{back}$) generated in the coil by the mechanical motion. The resulting instantaneous voltage ($\tilde{E}$) at the coil terminals is given by the sum of the instantaneous voltages across its various elements:

(7) $$\tilde{E}=R_cI\exp(-2\pi i\nu t)+L_c\frac{d}{dt}[I\exp(-2\pi i\nu t)]+E_{back}$$

Ordinarily, this is considered in terms of impedance (Z) of electrical elements. This is just the ratio of the instantaneous voltage to the instantaneous current. For the coil:

(8) $$Z_{coil}=\frac{\tilde{E}}{I\exp(-2\pi i t)}$$

By carrying out the differentiation in Equation 7, substituting Equation 6 into Equation 7 to eliminate $E_{back}$, and substituting the result into Equation 8 to eliminate $\tilde{E}$, there is finally obtained an expression for the electrical impedance of the coil in terms of the mechanical parameters (K, M, and R), the electrical parameters (Rc and Lc), and the electromechanical constant (D):

(9) $$Z_{coil}=R_c-i2\pi\nu L_c+\frac{D^2}{10^7}\frac{R-i\left(\frac{K}{2\pi\nu}-2\pi\nu M\right)}{R^2+\left(\frac{K}{2\pi\nu}-2\pi\nu M\right)^2}$$

The third term in Equation 9 will be referred to as the motional impedance ($Z_{mot}$) to distinguish it from the impedance due to the coil alone. By using a bridge circuit (with two identical coils, one of them movable in a magnetic field and the other stationary), there can be obtained the motional impedance directly.

As said earlier, in order to obtain the spring constant K, there may be obtained either resonant frequency, or the vibration response at a frequency well below resonance.

At the resonant frequency ($\nu_{res}$) the spring forces and inertial forces work in concert to make the amplitude of vibration a maximum. It is given by

(10) $$\nu_{res}=\frac{1}{2\pi}\sqrt{\frac{K}{M}}$$

If the mass is known, then a measure of $\nu_{res}$ gives K. It can be seen that if $\nu=\nu_{res}$ the terms in parentheses in Equation 9 drop out, and the real part of the motional impedance ($\alpha Z_{mot}$) becomes a maximum $$\frac{D^2}{10^7}\frac{1}{R}$$

and the imaginary (reactive) part of the motional impedance ($\delta Z_{mot}$) becomes zero. These facts can be used to design an electronic oscillator circuit that will automatically oscillate at the resonant frequency. The resonant frequency can then be read off on an electronic counter.

At a vibration frequency well below the resonant frequency, inertial forces and viscous forces become small compared to the spring forces. This allows the derivation of a measure of the spring constant. In Equation 9 the real part of the motional impedance becomes small. The imaginary (reactive) part of the motional impedance becomes approximately $$\frac{D^2}{10^7}\frac{2\pi\nu}{K}$$

The bridge circuit can be driven at frequency $\nu$, and the bridge output that is 90° out of phase with the input measured electrically. The output can be read out on a sensitive A.C. voltmeter.

In addition to its use in vibration ocular tonometry, these equations and this type of device find considerable use in viscoelastic measurements of various tissues. In viscoelastic measurements, both the real and the imaginary part of the motional impedance of Equation 9 are measured. These can be converted readily to elastic and viscous moduli.

*Dependence of spring constant on intraocular pressure*

So far there has been discussed a means for exciting the vibrations and determining the resonant frequency of vibration response. As yet, this analysis has not taken into consideration the value of the spring constant K and the viscous damping coefficient R of the corneal region of the eyeball, and how K depends upon intraocular pressure.

There is no means for determining R analytically. However, as long as R is reasonably low (i.e., eyeball not extremely viscous) it is not necessary to know its value, for it will not influence the performance.

By a fairly simple analysis there can be obtained an idea of how K will depend upon intraocular pressure. Consider FIG. 9, in which there is an imaginary container with a thin flexible wall filled with incompressible fluid at pressure P, and a force W pushing a flat plate against the surface of the container. W indents the container a distance $x$, and an area of diameter $d$ is flattened. Let $r$ be the radius of curvature in the region of the flattening. At equilibrium, the applied force W is approximately equal to the internal pressure P multiplied by the area of flattening:

$$(11) \qquad W = \pi \left(\frac{d}{2}\right)^2 P$$

By geometry, there is derived a relation between $d$ and $x$:

$$(12) \qquad \left(\frac{d}{2}\right)^2 = r^2 - (r-x)^2 = 2rx - x^2$$

Then by substituting Equation 12 into Equation 11 there is obtained a relation between the force W and the depth of indentation $x$:

$$(13) \qquad W = \pi(2rx - x^2)P$$

The spring constant K is defined as the incremental change in force with an incremental change in position ($dW/dx$). Thus there is obtained:

$$(14) \qquad K = \frac{dW}{dx} = \pi(2rx - x^2)\frac{dP}{dx} + \pi(2r - 2x)P$$

If the indentation is very small ($x \ll r$), and if the walls of the container are distensible, then P is not altered much by the presence of the device, and the term containing $dP/dx$ is negligible. Equation 14 becomes approximately:

$$(15) \qquad K \cong 2\pi rP$$

In obtaining this expression for the spring constant, the forces due to flexing of the wall and the effects of forces due to a fluid film between the container wall and the flat plate have been disregarded. Goldmann and Schmidt [Weiterer Beitrag zur Applanationstometrie, Ophthalmologica 141:441 (1961), and Uber Applanationstonometrie, Ophthalmologica 134:221 (1957)] have derived expressions for these last two forces for the case of the applanation tonometer applied to the cornea of the eye. Using their expressions, there is derived a more complete equation for the spring constant of the cornea. Both of these effects tend to increase the spring constant. By using force against the cornea of about 1.5 grams these effects can presumably be minimized. Of these two forces (corneal bending and surface tension), the one due to surface tension is the more troublesome, because it depends upon the amount of fluid trapped around the flattened area between the cornea and the flat plate. If there is very little fluid, the surface forces appear to be large enough to cause a considerable increase in the spring constant of the eye (at constant I.O.P.). This is very noticeable in experiments with enucleated eyeballs. In the living eye, the oily film (sebaceous secretion) over the cornea should tend to reduce these surface forces. However, as a precaution against errors that might occur with dry eyes, the surface of the contact pad is made relatively non-wetting and small droplets of saline water are placed around the edge of the face of the contact pad. This prevents the fluid from forming a sharp radius between cornea and contact pad. (It will be recalled that fluid surface forces are inversely proportional to the radius of curvature of the fluid film.) Since the radius of curvature of the human cornea is relatively constant (0.786 cm. radius with a standard deviation of 0.026 cm., according to Stenstrom [Untersuchungen uber die Variation und Kovariation der Optischen Elemente des Menschlichen Auges, Acta Ophthalmologica, Supplement 26 (1946)], it is seen that the spring constant with the device against the human cornea should depend almost exclusive upon the intraocular pressure P, increasing in direct proportion with P.

The spring constant of Equation 15 may be referred to as a static spring constant, because it is derived on the basis of static forces and indentations. In a vibrating system, Equations 1 through 10, the spring constant referred to is a dynamic one. The dynamic spring constant is frequently different from the static one; that is, spring constant is a function of frequency. This appears to be the case with corneal tissue, where stiffness (in the form of distensibility) is a function of rate of change of stress, St. Helen, Roger and McEwen, W. K. [Rheology of Human Sclera, Am. J. Ophth. 52:539–547 (1961)]. As a first approximation, however, it is assumed that the static and dynamic spring constants are the same.

For the case of resonant frequency measurement, it is possible to substitute Equation 15 into Equation 10 and obtain the mechanical resonant frequency ($\nu_{res}$) as:

$$(16) \qquad \nu_{res} \cong \sqrt{\frac{Pr}{2\pi M}}$$

Since M is a constant for the device, and $r$ is approximately constant, it would be expected that the resonant frequency would increase as the square root of the intraocular pressure.

For the case of measuring the reactive component of the motional impedance ($\delta Z_{mot}$) at a low frequency:

$$(17) \qquad \delta Z_{mot} \cong \frac{D_2}{10^7} \frac{\nu}{Pr}$$

Since $D^2/10^7$ is a constant for the device, $\nu$ is held constant, and $r$ is approximately constant, it would be expected that $\delta Z_{mot}$ would vary inversely with intraocular pressure.

Thus there are two different means by which to obtain a measure of intraocular pressure, as seen by Equations 16 and 17.

The technique in using the tonometer is simple. Once the tonometer is placed approximately along the visual axis, the patient is told to stare at the fixation light and to open his eyelids wide. The eyepiece is wetted slightly around the outer edge as described above. Then the device is moved up to contact the eyepiece with the cornea and the instrument moved slightly further. It is only necessary to leave the device on the cornea for a few seconds to get a reading. Readings can be converted directly to intraocular pressure using a calibration curve.

Clinical tests gave resonant frequency readings between 70 and 75 c.p.s. for persons with normal intraocular pressure. Resonant frequency appears to rise about 1 c.p.s. for each pressure increase of 1 mm. Hg above normal. The vibrating plunger used had a mass of 2.3 grams. The contact pad pushed against the eye with an average force of 2.2 grams. The alternating force, superimposed upon the average force, had a peak-to-peak value of 0.5 gram.

It is thus seen that the invention provides an improved vibration tonometer and an improved method of using it.

While one embodiment of the invention has been described for purposes of illustration it will be understood that there may be other embodiments and modifications within the general scope of the invention.

I claim:

1. A vibratory surface-indenting tonometer, as for measuring the intraocular pressure response of an eyeball, comprising in combination, a vibratory plunger having an end contact element for engaging the part to be tested, a coil carried by said plunger, a magnet having elongated pole pieces embracing said coil, means for supplying said coil with a direct current component to bias the coil and plunger axially, means for supplying said coil with alternating current component for vibrating it at any biased position of said coil relative to said pole pieces, and means responsive to the signal produced by the amplitude of movement of said coil relative to said pole piece for determining said amplitude of movement of said coil.

2. A vibratory surface-indenting tonometer as set forth in claim 1, which further includes means for establishing a vibratory frequency of said coil in accordance with the maximum amplitude of movement of said plunger at the resonant frequency of the part engaged by said contact element.

3. A vibratory surface-indenting tonometer as set forth in claim 1, which includes means for establishing a frequency of oscillation below resonant frequency of the part engaged, and including a tuned response device for minimizing response to other noise frequencies.

4. A vibratory surface-indenting tonometer, as for measuring the intraocular pressure response at the cornea of an eye, comprising in combination, a magnet having a central pole piece with an axial bore, a plunger-supporting core having an axial bore aligned with the bore of the magnet pole piece, a vibratory tubular plunger mounted for axial movement on said core, a coil carried by said plunger within the flux field of said magnet, means for supplying said coil with a direct current component to bias the coil and plunger axially, means for supplying the coil with an alternating current component for vibrating it at any bias position of the coil relative to said pole piece, means responsive to the signal provided by the amplitude of movement of said soil relative to said pole piece and an object contacting element on the end of the tubular plunger in the line of the bores of said magnet and plunger-supporting core.

5. A vibratory surface-indenting tonometer, as for measuring the intraocular pressure response at the cornea of an eye, comprising in combination, a magnet having a central pole piece with an axial bore, a plunger-supporting core having an axial bore aligned with the bore of the magnet pole piece, a vibratory tubular plunger mounted for axial movement on said core, a coil carried by said plunger within the flux field of said magnet for biasing and vibrating said plunger axially and providing a signal indicative of the amplitude of movement of said plunger, an object contacting element on the end of the tubular plunger in the line of the bores of said magnet and plunger-supporting core, said contacting element being transparent, and means for producing a beam of light through said bores and said contacting element.

6. A vibratory tonometer as set forth in claim 5, in which said core is provided with gas outlets within the tubular plunger for floating it thereon, and means for supplying gas through said bores to said gas outlets, said gas outlets in said tubular plunger exhaust said gas at a distance from said eye.

7. A vibratory surface-indenting tonometer, as for measuring the intraocular pressure response at the cornea of an eye, comprising in combination, a magnet having a central pole piece with an axial bore, a plunger-supporting core having an axial bore aligned with the bore of the magnet pole piece, a vibratory tubular plunger mounted for axial movement on said core, a coil carried by said plunger within the flux field of said magnet for biasing and vibrating said plunger axially and providing a signal indicative of the amplitude of movement of said plunger, said core being provided with gas outlets from its bore to the interior of the tubular plunger to provide a gas-float bearing therefor, a gas supply fitting secured to the end of the magnet opposite the core and having a bore aligned with the magnet bore, means to supply gas to said fitting bore, said tubular plunger having outlets for exhausting gas at a distance from said eye, a transparent closure over said fitting bore behind said gas supply means, means for directing a parallel ray light beam through said transparent closure, said bores and said transparent contacting element, and an object contacting element on the end of said tubular plunger in the line of the bores of said magnet and plunger-supporting core, said contacting element being transparent and sealing the outer end of said tubular plunger.

8. A vibration surface-indenting tonometer for measuring intraocular pressure, comprising in combination, a vibratory plunger carrying an eye engaging plate on its outer end, means supporting said plunger for substantially frictionless vibratory movement, a coil carried by said plunger, a magnet having pole pieces providing a substantially uniform flux field of greater axial length than said coil, means for supplying said coil with a steady current component for biasing the coil axially relative to the magnet pole pieces to urge said eye engaging plate against the eye, means for supplying said coil with alternating current component to vibrate it at desired frequency against the eye while biased toward the eye by steady current, and means responsive to the signal output of said coil when reciprocated for providing an indication of intraocular pressure.

9. A vibratory surface-indenting tonometer, as for measuring intraocular pressure, comprising in combination, an axially vibratory plunger carrying an object engaging element on its outer end, means supporting said plunger for substantially frictionless vibratory movement, a coil carried by said plunger, a magnet providing an axially extensive transverse flux field for said coil, the magnet and coil arrangement being such as to provide a substantially uniform effect over an extensive axial movement of said coil, means for supplying said coil with a steady biasing current component to urge said plunger and its contacting element outward toward an object to be tested for pressure response, means for supplying the coil with alternating current component to vibrate the plunger at a desired frequency, and means responsive to the signal output of said coil when reciprocated for providing an indication of the pressure response of said object.

10. A vibratory surface-indenting tonometer for measuring intraocular pressure, comprising in combination, a supporting core member, a tubular vibratory plunger mounted for axial movement on said core member, an eye contacting plate carried on the outer end of said plunger and closing its end, means for supplying gas under the pressure between said tubular plunger and said core member for floating the plunger on the core for substantially frictionless movement relative thereto, said tubular plunger having outlets for exhausting said gas at a distance from said eye, a skirt carried by the inner end of said tubular plunger, an annular coil carried by said skirt, a magnet having pole pieces flanking said coil on the sides, said pole pieces having an effective zone of substantially uniform flux of considerably greater axial length than said coil, means for supplying said coil with a steady direct current component for urging it axially relative to said pole pieces to apply a steady pressure by said plate against the eye, means for supplying alternating current at various frequencies to said coil to vibrate it at various frequencies, and means responsive to the current produced by the movement of said plunger against the eye and the accompanying movement of the coil between said pole pieces for providing an indication of the pressure within the eye.

References Cited by the Examiner

UNITED STATES PATENTS

| | | | |
|---|---|---|---|
| 2,387,223 | 10/45 | Carson | 73—516 |
| 2,403,999 | 7/46 | Read | 73—67.2 |
| 2,415,310 | 2/47 | Sommerville | 128—2 |
| 2,742,035 | 4/56 | Hancock | 128—2 |
| 3,070,087 | 12/62 | Sittel | 128—2 |

FOREIGN PATENTS 867,128   5/61   Great Britain.

RICHARD C. QUEISSER, *Primary Examiner.*

LOUIS R. PRINCE, DAVID SCHONBERG,
*Examiners.*